(12) United States Patent
Maeda et al.

(10) Patent No.: US 12,164,321 B2
(45) Date of Patent: Dec. 10, 2024

(54) POWER AND CURRENT BALANCING SYSTEMS AND ASSOCIATED METHODS THEREOF

(71) Applicant: Panasonic Avionics Corporation, Irvine, CA (US)

(72) Inventors: Kenji Maeda, Irvine, CA (US); Eric Chim, Irvine, CA (US); Yichao Jiang, Irvine, CA (US)

(73) Assignee: Panasonic Avionics Corporation, Irvine, CA (US)

( * ) Notice: Subject to any disclaimer, the term of this patent is extended or adjusted under 35 U.S.C. 154(b) by 280 days.

(21) Appl. No.: 17/738,740

(22) Filed: May 6, 2022

(65) Prior Publication Data
US 2023/0359233 A1 Nov. 9, 2023

(51) Int. Cl.
| | |
|---|---|
| G05F 1/56 | (2006.01) |
| G05F 1/575 | (2006.01) |
| G06F 1/26 | (2006.01) |
| H01R 13/66 | (2006.01) |
| H04B 3/54 | (2006.01) |

(52) U.S. Cl.
CPC .............. G05F 1/575 (2013.01); G06F 1/26 (2013.01); H01R 13/665 (2013.01); H04B 3/54 (2013.01)

(58) Field of Classification Search
CPC ... G05F 1/10; G05F 1/46; G05F 1/462; G05F 1/56; G05F 1/565; G05F 1/575; G06F 1/26; G06F 1/266; G06F 1/28; H01R 13/665; H04B 3/54; H04B 3/548
See application file for complete search history.

(56) References Cited

U.S. PATENT DOCUMENTS 9,110,644 B2 * 8/2015 Dinh .................. G06F 1/26

* cited by examiner

*Primary Examiner* — Long Nguyen
(74) *Attorney, Agent, or Firm* — LOZA & LOZA, LLP

(57) ABSTRACT

Methods and systems are provided for current and/or power balancing. One method includes comparing a first input current of a first regulator in a first path between a power source and a power sink with a second input current of a second regulator in a second path between the power source and the power sink; lowering an output from the first regulator, in response to the first input current being higher than the second input current; and increasing an output from the second regulator, in response to the second input current being higher than the first input current.

20 Claims, 15 Drawing Sheets

Example for Figure 1B
Deliver System Load 130W
Coupling circuit : 0.4ohm each
Connector : 0.03ohm each
Target system current: 2.4A per conductor

| Impedance (ohm) | Ent voltage (V) | Ent current (A) | System load (W) |
|---|---|---|---|
| 0.18 | 27.26 | 4.10 | 111.77 |
| 0.98 | 27.26 | 0.75 | 20.53 |
| | | | 132.30 |

TABLE I

FIG. 1C

Example for system 200 (Fig. 2A):
Deliver System Load 130W
Coupling circuit : 0.4ohm each
Connector : 0.03ohm each
Meets target system current of 2.4A per conductor

| Supplied source impedance (Ω) | Sub voltage (V) | Sub current (A) | Sub voltage (V) | System load (W) | Fault current (A) |
|---|---|---|---|---|---|
| 0.18 | 25 | 2.4 | 24.93 | 59.83 | 2.17 |
| 0.98 | 25 | 2.4 | 24.93 | 59.83 | 2.33 |
|  |  |  |  | 19.65 |  |

TABLE III

FIG. 2B

Example for System 200A (Figure 2C)
Deliver System Load 130W
Coupling circuit : 0.4ohm each
Connector : 0.03ohm each
Target system current: 2.4A per conductor for power pin and 1A for the data signal rail.

| Impedance (ohm) | 5int voltage (V) | 5int current (A) | System voltage (V) | System load (W) | System current (A) |
|---|---|---|---|---|---|
| 0.18 | 23.00 | 2.40 | 22.93 | 55.03 | 1.98 |
| 0.98 | 23.00 | 2.40 | 22.93 | 55.03 | 2.03 |
| 0.98 | 22.96 | 1.00 | 22.93 | 22.93 | 0.85 |
|  |  |  |  | 132.98 |  |

TABLE IIII

FIG. 2D

| Impedance (ohm) | Src voltage (V) | Src current (A) | Sink voltage (V) | System load (W) | Ifault current (A) |
|---|---|---|---|---|---|
| 0.18 | 25 | 2.605056 | 24.92 | 65.13 | 2.40 |
| 0.98 | 24.99 | 2.237310924 | 24.92 | 55.91 | 2.40 |
| | | | | 121.04 | |

TABLE IV

FIG. 3B

| Impedance (ohm) | Init voltage (V) | Init current (A) | Init voltage 2 (V) | System load (W) | Inult current (A) |
|---|---|---|---|---|---|
| 0.18 | 25 | 2.605056 | 24.92 | 65.13 | 2.40 |
| 0.98 | 24.99 | 2.237310924 | 24.92 | 55.91 | 2.40 |
| | | | | 121.04 | |

TABLE V

FIG. 4B

POWER AND CURRENT BALANCING SYSTEMS AND ASSOCIATED METHODS THEREOF

TECHNICAL FIELD

The present disclosure relates to balancing systems and methods, and more particularly, to methods and systems for balancing one or more of power, current and voltage for a system load at a computer system interface.

BACKGROUND

Conventional computer system interface typically transfer power as system load between a power source and a sink component using a single path, e.g., between a one pin connector and a single cable. This approach has shortcoming because connectors and cables have to accommodate a highest current path, and hence, may require expensive and large connectors and thicker cables to enable transmission of high current amperage.

Another conventional system combines multiple connector pins to increase the number of available paths for distributing power. This conventional approach also has shortcomings because any impedance difference between paths results in uneven current distribution. This requires use of connectors and cables with higher current ratings, and hence, the connectors become more expensive and larger in size, and cables need to be of thicker wire gauge.

Continuous efforts are being made to develop technology to efficiently transfer power between a source and a sink using cost-effective methods and systems.

BRIEF DESCRIPTION OF THE DRAWINGS

The various features of the present disclosure will now be described with reference to the drawings of the various aspects disclosed herein. In the drawings, the same components may have the same reference numerals. The illustrated aspects are intended to illustrate, but not to limit the present disclosure. The drawings include the following Figures:

FIG. 1C shows Table I in support of the second conventional system of FIG. 1B;

FIG. 2B shows Table II in support of the example of the system of FIG. 2A;

FIG. 2D shows Table III in support of the example of system of FIG. 2C;

FIG. 3B shows Table IV in support of the system of FIG. 3A, according to one aspect of the present disclosure;

FIG. 4B shows Table V in support of the system of FIG. 3B, according to one aspect of the present disclosure;

DETAILED DESCRIPTION

In one aspect, innovative technology is disclosed herein where a component that is a "power receiver", also referred to as a "sink" includes a voltage balancer to adjust a current flowing through a system connector and cable between a power source and the sink. The voltage balancer monitors the input current and adjusts the output voltage from the voltage balancer. For example, assume that the power source has at least two paths (Path "A" and Path "B") to transmit current/power to the sink. Furthermore, assume that the path "B" has higher impedance vis-à-vis the path "A". This will result in lower voltage on path B at the sink. In this case, the voltage balancer on path "B", adjusts the output voltage of path B so that the output voltage on path "B" compensates for the loss due to the impedance difference. This ensure that the current(s) flowing through the system connector/cables are within an expected range.

In another aspect, this innovative technical solution can be applied to combine lower rated power pins to add more power capability on the sink side. For example, some connectors include a power pin with higher current rating and a signal pin with lower current rating. By applying the technology disclosed herein, the different power pins with different impedance can be combined, as well as signal pins can be combined to increase sink power capability by adjusting voltage balancer output voltage, as described below in detail.

In another aspect, a system is provided with a microcontroller and a digital regulator on each path between a power source and a sink. The microcontroller reads the input current to the sink on each path and an output voltage is either reduced or increased to control power balancing output of the digital regulators.

In another aspect, each path is provided with a current sense module and an analog voltage regulator. This enables the voltage regulators to adjust output voltage and maintain the input current of each path to be less than a desired system current. Details regarding the various aspects of the present disclosure are provided below.

Figure 1A:
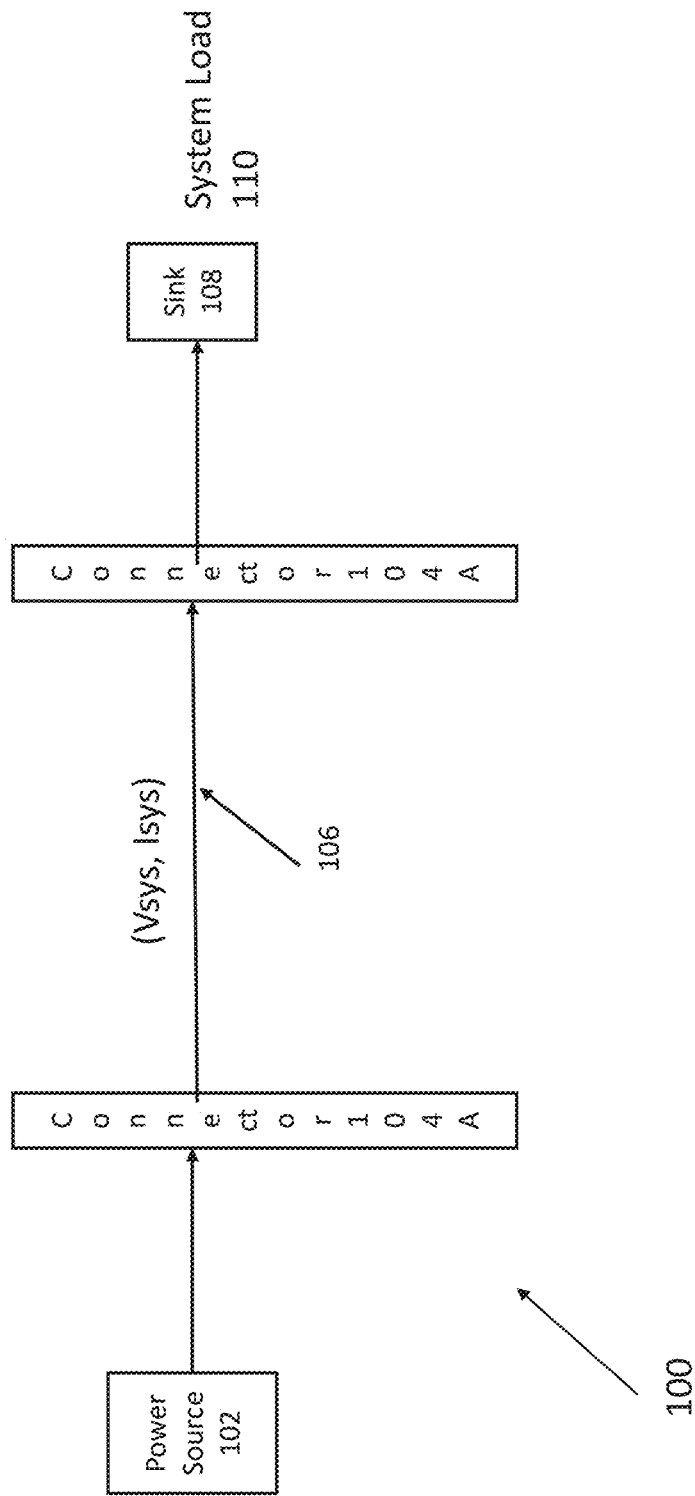
FIG. 1A shows a first conventional system that is improved by the various aspects of the present disclosure.

System 100: FIG. 1A shows an example of a conventional system 100 for delivering power from a power source 102 to a sink 108 for a system load 110 via a single path. The single path between the power source 102 and sink 108 includes connectors 104A and 104B and a cable 106. As an example, to carry voltage, Vsys and current, Isys, which as an example, may be 28V and 5 A, connectors 104A/104B need a higher current rating, and are larger in size. Cable 106 also needs to be of a thicker gauge. This is undesirable and the various technical solutions described herein solve this challenge.

Figure 1B:
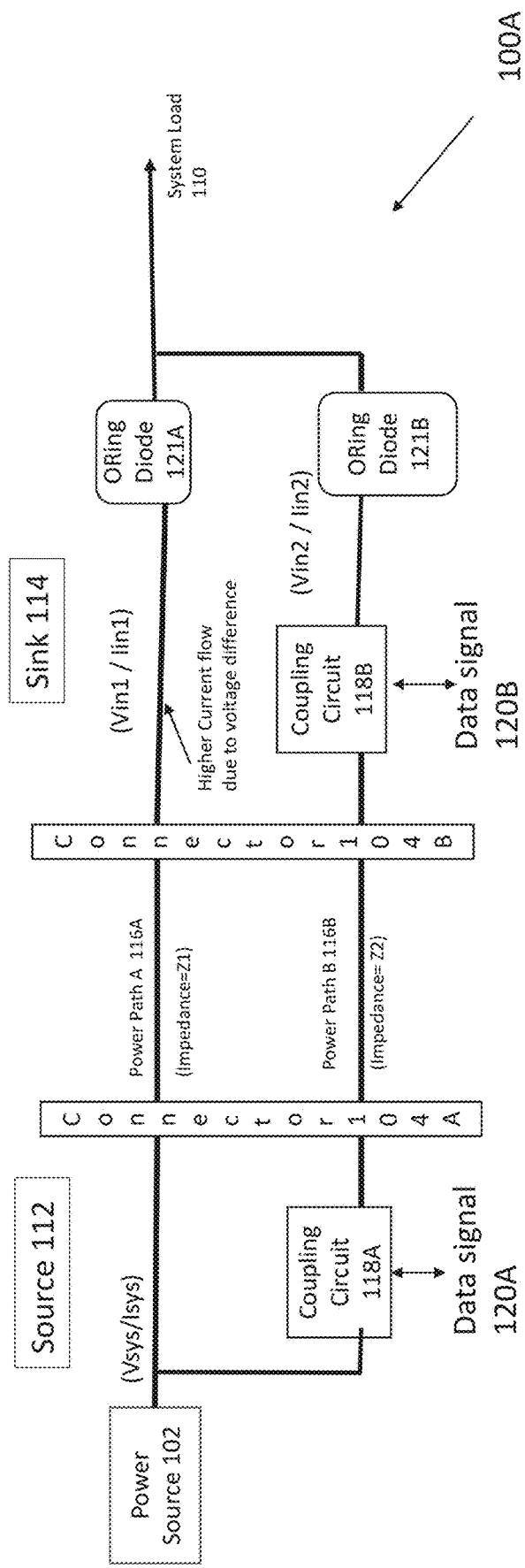
FIG. 1B shows a second conventional system that is improved by the various aspects of the present disclosure.

System 100A: FIG. 1B shows an example of a conventional system 100A with two paths 116A and 116B between the power source power 102 and the sink 114. System 100A includes coupling circuits 118A and 118B in the path 116B. The coupling circuits 118A and 118B (may also be referred to as coupling circuit 118 or coupling circuits 118) are used to maintain signal quality for data signals 120A/120B and power over a pair of conductors (not shown). The coupling circuits 118A and 118B causes an impedance difference between path 116A and path 116B. For example, the impedance for path 116A may be Z1, while the impedance in path 116B may be Z2, where Z2 is greater than Z1 due to the coupling circuits 118A and 118B.

The voltage from power source 102 is represented by Vsys. The voltage in path 116A, after connector 104B is represented by Vin1, while the current is represented by Iin1. The sink current in path 116A is represented by Iin1, while the sink current in path 116B is represented by Iin2. As an example:

$$Vin1=(Vsys-Iin1 \times Z1)$$

$$Vin2=(Vsys-Iin2 \times Z2)$$

To achieve the same voltage in paths 116A and 116B, i.e., for Vin1 to be equal to Vin1, Iin1 will be greater than Iin2, due to the difference between impedance Z2 and Z1 in paths 116A and 116B.

As an example, for a system load is 130 W, assume that the output from connector 104B in path 116A is 27.6V (Vin1)/4.1 A (Iin1), the output from connector 104B in path 116B is 27.26V (Vin2)/0.75 A (Iin2) because Z1 in path 116A is 0.18 ohms, while Z2 in path 116B is 0.98 ohms. This is also shown in Table I in FIG. 1C. Thus, the sink current, Iin1 to oring diode 121A is 4.1 A, while the sink current Iin2 to oring diode 121B is 0.75 A. Oring diodes 121A/121B (may also be referred diode 121 or oring diodes 121) are typically used to connect multiple power supplies to increase reliability or to increase total power. Similar to system 100, system 100A also requires connectors and cables with higher current ratings, which is undesirable.

Figure 1D:
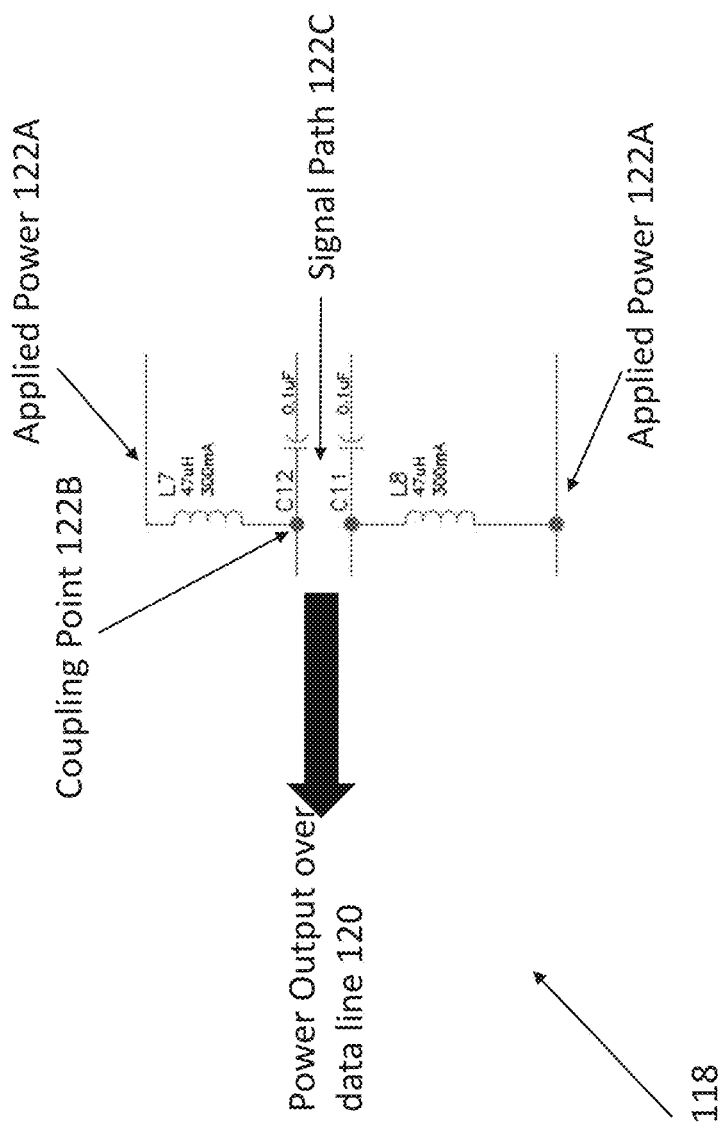
FIG. 1D shows an example of a coupling circuit.

FIG. 1D shows an example of the coupling circuit 118 that has a signal path 122C with coupling point 122B. The coupling circuit receives power 122A and outputs 120 over a data line.

Figure 2A:
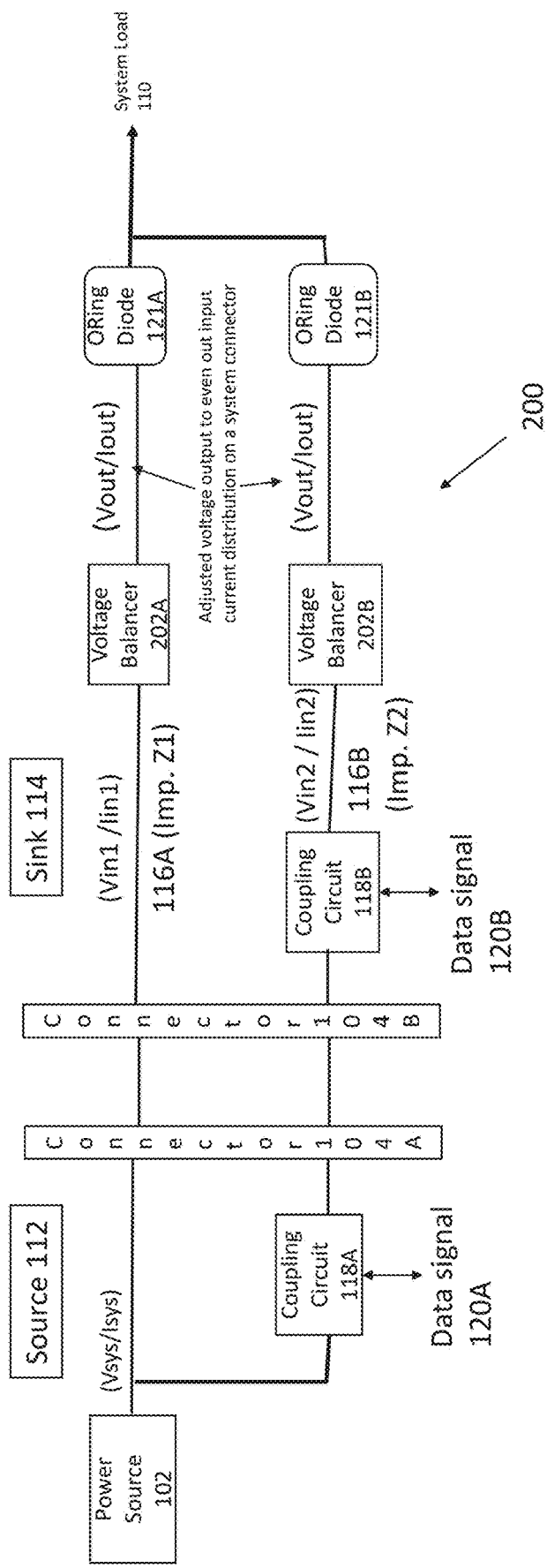
FIG. 2A shows an example of a system using voltage balancers, according to one aspect of the present disclosure.

System 200: FIG. 2A shows a system 200 with voltage balancers 202A and 202B, respectively, according to one aspect of the present disclosure. In system 200, path 116A with impedance Z1 and path 116B with impedance Z2, where Z2 is greater than Z1, include the voltage balancers 202A/202B (may also be referred to as voltage balancer 202 and voltage balancers 202) to adjust voltages Vin1 and Vin2 based on an input current Iin1 and Iin2 values to generate Vout, Iout that is provided to oring diodes 121A and 121B, respectively for the system load 110. As mentioned above with respect to FIG. 1C, the input currents Iin1 and Iin2 can vary due impedance difference between paths 116A and 116B. System 200 balances output power from the voltage balancers 202.

As shown in FIG. 2A, the power source 102 provides a voltage/current shown as Vsys/Isys. The input voltage and current to the voltage regulator 202A is shown as Vin1 and Iin1, while input voltage and current to the voltage regulator 202B is shown as Vin2 and Iin2. The output voltage and current from the voltage regulator 202A is shown as Vout1 and Iout1, while output voltage and current from the voltage regulator 202B is shown as Vout2 and Iout2. The following shows the relationship between (Vsys, Isys), (Vin1, Iin1), (Vin2, Iin2), and (Vout, Iout):

$$Vin1=(Vsys-Iin1 \times Z1)$$

$$Vin2=(Vsys-Iin2 \times Z2)$$

$$Vsys \times Isys=Vin1 \times Iin1+Vin2 \times Iin2=Vout \times Iout \times 2$$

Z2 is greater than Z1 due to the coupling circuits 118A and 118B, respectively. The output power of voltage balancers 202A and 202B is substantially equal because (Vout, Iout) is identical, regardless of the impedance difference between the power paths 116A and 116B. Therefore, Iin1 is limited to a lower current compared to the conventional method of FIG. 1C, described above in detail.

Table II of FIG. 2B shows an example of using the voltage balancers 202A/202B of FIG. 2B, according to one aspect of the present disclosure. In Table II, the impedance of paths 116A (0.18)/116B (0.98) is shown under column labelled, "impedance." The column labelled "Sink Voltage" shows Vout1 and Vout2. The column labelled "Sink Current" shows Iout1 and Iout2. The column labelled "Input Current" shows Iin1 and Iin2. Assume that the system load is 130 W and a target current, Iout is 2.4 A. In path 116A, the input voltage Vin1 to the voltage balancer 202A is 27.61V (not shown in Table II) and input current Iin1 is 2.17 A. The input voltage, Vin2 to voltage balancer 202B is 25.72V (not shown in Table II) and input current Iin2 is 2.33 A. The outputs of both the voltage balancers 202A/202B are adjusted so that the output from both voltage balancers is 25V (Vout)/2.4 A (Iout), which balances the output power in both paths 116A and 116B. This ensures that the current flowing through the cable/connectors is within an expected range (or a threshold value), e.g. below 2.4 A.

Figure 2C:
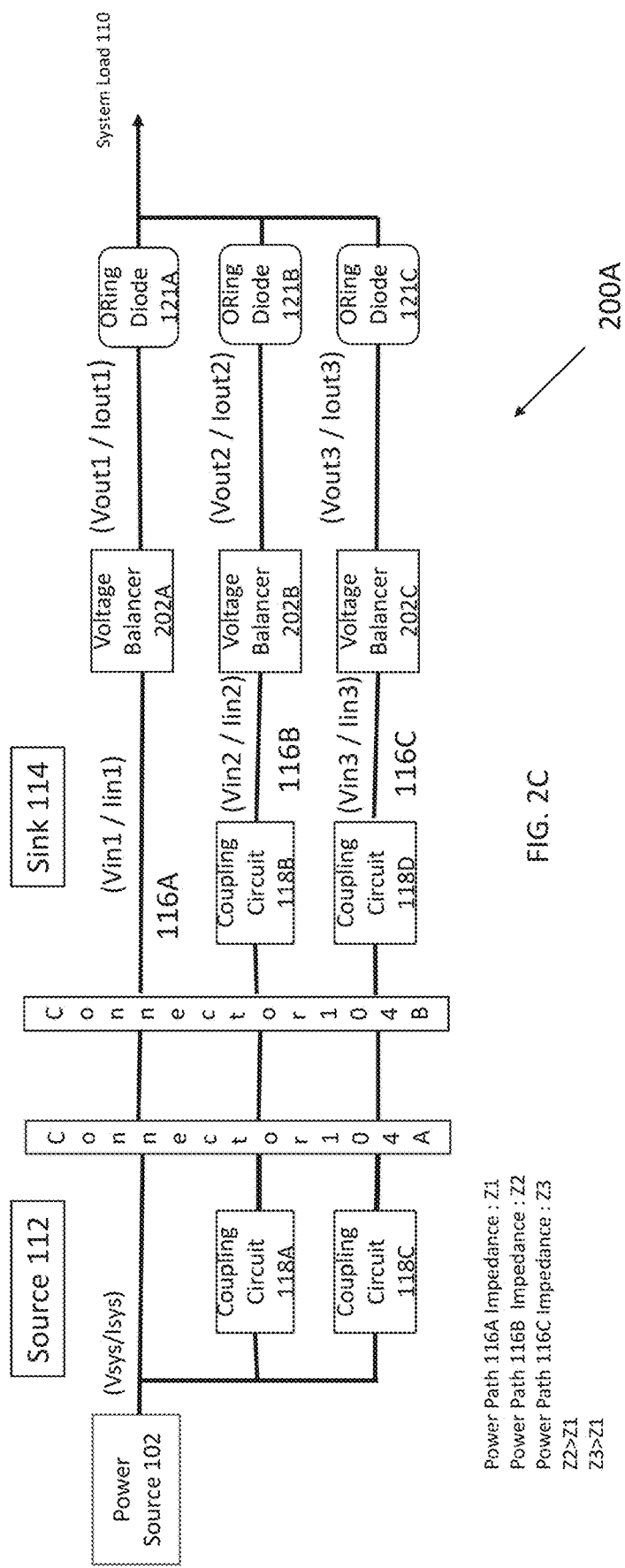
FIG. 2C shows another example of a system using voltage balancers, according to one aspect of the present disclosure.

System 200A: FIG. 2C shows a system 200A with three paths, for example, path 116A with impedance Z1, path 116B with impedance Z2 and path 116C with impedance Z3 between the power source 102 and sink 114 to generate a system load 110 at sink 104. Each path includes a voltage balancer, namely, 202A, 202B and 202C. Path 116C includes coupling circuits 118C and 118D like coupling circuits 118A and 118B of path 116B, respectively. Impedance Z2 and Z3 are larger than Z1 due to additional coupling circuits 118A-118D.

(Vsys, Isys) is the output from the power source 102. (Vin1, Iin1) is input to voltage balancer 202A that outputs (Vout1, Iout1). (Vin2, Iin2) is input to voltage balancer 202B that outputs (Vout2, Iout2). (Vin3, Iin3) is input to voltage balancer 202C that outputs (Vout3, Iout3). The following shows the relationship between (Vsys, Isys), (Vin1, Iin1), (Vin2, Iin2), (Vin3, Iin3), (Vout1, Iout1), (Vout2, Iout2) and (Vout3, Iout3):

$$Vsys \times Isys=Vout1 \times Iout1+Vout2 \times Iout2+Vout3 \times Iout3$$

$$Vout1 \times Iout1=(Vsys-Iin1 \times Z1) \times Iin1$$

$$Vout2 \times Iout2=(Vsys-Iin2 \times Z2) \times Iin2$$

$$Vout3 \times Iout3=(Vsys-Iin3 \times Z3) \times Iin3$$

For system 200A, Vout3 can be set to a lower value than Vout1 and Vout2 to reduce Iin3 because power path 116C may be rated with a lower current value than paths 116A and 116B. System 200A enables adding power path with different current ratings, allowing higher power delivery with compact system interfaces.

Table III shows an example of using system 200A of FIG. 2C. In Table III the impedance in paths 116A/116B/116C is shown under the column labelled, "Impedance." The column labelled "Sink Voltage" shows Vout1, Vout2 and Vout3. The column labelled "Sink Current" shows Iout1, Iout2 and Iout3. The column labelled "Input Current" shows Iin1, Iin2 and Iin3. Table III shows an example where impedance Z1 in path 116A is 0.18 ohms, the impedance, Z2 and Z3 in paths 116B and 116C is 0.98 ohm. Voltage balancer 202A receives a voltage of 27.61V (Vin1) (not shown in Table III) and current 1.98 A (Iin1), voltage balancer 202B receives voltage 26.91 (Vin2) (not shown in Table III) and current 2.03 A (Iin2), while voltage balancer 202C receives a voltage of 27.17V (Vin3) (not shown in Table III) and current of 0.85 A (Iin3). The target system current is 2.4 A or less. The voltage balancer 202A adjusts the output voltage to 23V (Vout1) and current to 2.4 A (Iout1), the voltage balancer 202B adjusts the voltage to 23V (Vout2) and current of 2.4 A (Iout2), while voltage balancer 202C adjusts the voltage to 22.96V (Vout3) and current of 1 A (Iout3).

In one aspect, system 200A can be used in an environment where powers pins have a higher rating, while signal pins have a lower rating. By using the voltage balancers 202 of system 200A, different power pins with different impedance and different signal pins can be used to increase sink power capability.

Figure 2E:
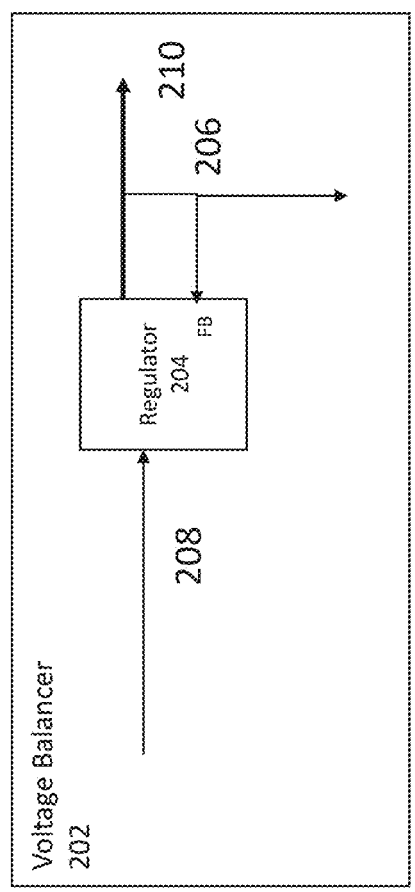
FIG. 2E shows an example of a voltage balancer, according to one aspect of the present disclosure.

FIG. 2E shows an example of the voltage balancer 202 with a voltage regulator 204 having a feedback loop 206. The voltage regulator 204 receives an input 208 (Vin, Iin (FIG. 2C)) to generate an output (Vout, Iout (FIG. 2C)) 210. The voltage regulator 204 adjusts output voltage in paths 116A, 166B and 116C, as shown in FIGS. 2A and 2C, which balances the output power on each path. This reduces the impact of impedance difference in the different power paths.

Figure 3A:
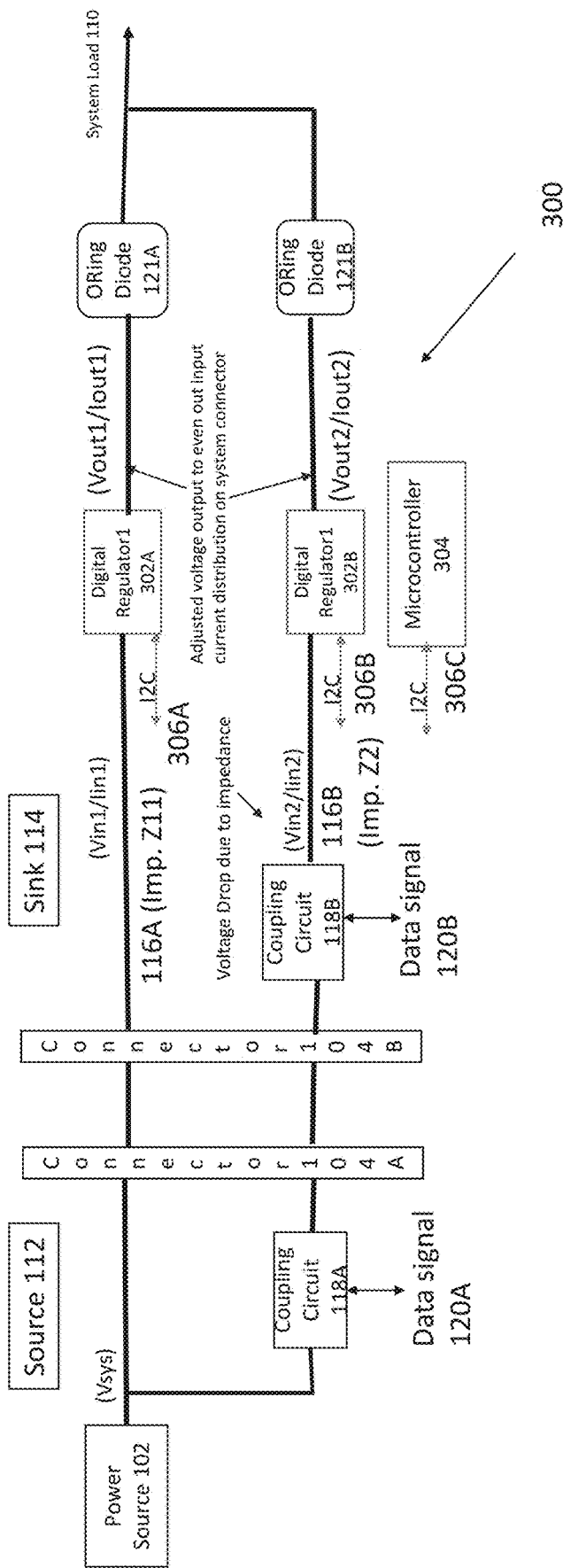
FIG. 3A shows an example of a system with digital regulators for current balancing, according to one aspect of the present disclosure.

System 300A: FIG. 3A shows a system 300, according to one aspect of the present disclosure. System 300 includes a digital regulator 302A in path 116A that communicates with a microcontroller 304 via a bus 306A (e.g., an I2C or any other bus type) and a digital regulator 302B in path 116B that communicates with the microcontroller 304 via a bus 306B (e.g., I2C or any other bus type).

The power source 102 provides a voltage shown as Vsys. The impedance Z1 of path 116A is less than impedance Z2 of path 116B due to coupling circuits 118A and 188B, as described above. The input voltage and current to the digital regulator 302A is shown as Vin1 and Iin1, while input voltage and current to the digital regulator 302B is shown as Vin2 and Iin2. The output voltage and current from the digital regulator 302A is shown as Vout1 and Iout1, while output voltage and current from the digital regulator 302B is shown as Vout2 and Iout2. The example impedance, voltage and current values are shown in Table IV of FIG. 3D where the impedance of paths 116A (0.18)/116B (0.98) is shown under column labelled, impedance. The column labelled "Sink Voltage" shows Vout1 (25V) and Vout2 (24.99V). The column labelled "Sink Current" shows Iout1 (2.605056 A) and Iout2 (2.237310924 A). The column labelled "Input Current" shows Iin1 (2.4 A) and Iin2 (2.4 A).

The following shows the relationship between input and output voltage/current at the digital regulators 302A and 302B: Vout1×Iout1/Vin1=Vout2×Iout2/Vin2

In one aspect, the microcontroller 304 monitors/reads the input current to the digital regulators 302A and 302B, e.g., Iin1 and Iin2 in paths 116A and 116B, respectively. The voltage difference between the paths 116A and 116B, namely, Vout1 and Vout2 are adjusted to balance the output power to the oring diodes 121A and 121B.

As an example, for system 300, Vout1 is set lower than Vout2 to match Iin1 and Iin2 to ensure that the system currents Iin1 and Iin2 are within a system interface current rating. If Iin1 is larger than Iin2, Vout1 is lowered by steps until Iin1 and Iin2 are within acceptable current ratings.

System 300A is especially useful in an environment which does not have a large margin/tolerance, but accurate control is needed over input current.

As an example, microcontroller 304 executes programmable instructions out of a memory device (not shown). Microcontroller 304 may be a programmable, hardware-based, general-purpose or special-purpose microprocessor, a digital signal processor (DSP), a programmable controller, an application specific integrated circuit (ASIC), a programmable logic device (PLD), or the like, or a combination of such devices. Furthermore, as an example, bus 306A/306B/306C may represent any one or more separate physical buses and/or point-to-point connections, connected by appropriate bridges, adapters and/or controllers. In one aspect, bus 306A/306B/30C may include, for example, an I2C bus, a system bus, a Peripheral Component Interconnect (PCI) bus, a PCI-Express bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type. The adaptive aspects described herein are not limited to any specific interconnect or bus type.

Figure 4A:
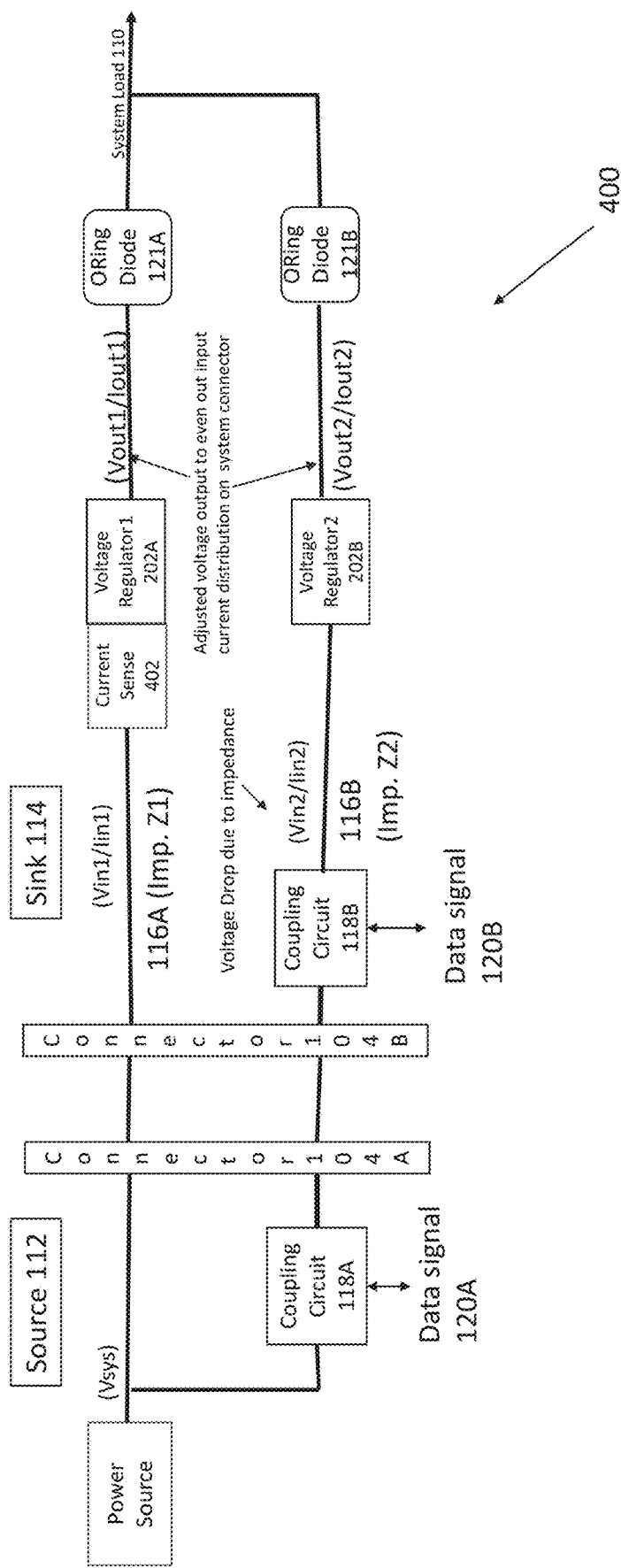
FIG. 4A shows an example of a system with analog regulators for current balancing, according to one aspect of the present disclosure.

System 400: FIG. 4A shows a system 400, according to one aspect of the present disclosure. System 400 includes a current sense module 402 in path 116A coupled to the voltage regulator 202A, which in this example is an analog voltage regulator/balancer described above with respect to FIGS. 2A and 2C. Path 116B also includes a voltage regulator 202B, that is similar to the voltage regulator 202A.

As shown in FIG. 4, the power source 102 provides a voltage shown as Vsys. The impedance Z1 of path 116A is less than impedance Z2 of path 116B due to coupling circuits 118A and 188B, as described above. The input voltage and current in path 116A is shown as Vin1 and Iin1, while input voltage and current in path 116B is shown as Vin2 and Iin2. The output voltage and current in path 116A is shown as Vout1 and Iout1, while output voltage and current in path 116B is shown as Vout2 and Iout2. The example impedance, voltage and current values are shown in Table V of FIG. 4B where the impedance of paths 116A (0.18)/116B (0.98) is shown under column labelled, impedance. The column labelled "Sink Voltage" shows Vout1 (25V) and Vout2 (24.99V). The column labelled "Sink Current" shows Iout1 (2.605056 A) and Iout2 (2.237310924 A). The column labelled "Input Current" shows Iin1 (2.4 A) and Iin2 (2.4 A).

The following shows the relationship between input and output voltage/current at the digital regulators 302A and 302B: Vout1×Iout1/Vin1=Vout2×Iout2/Vin2

As an example, for system 400, similar to system 300 of FIG. 3A, Vout1 is set lower than Vout2 to match Iin1 and Iin2 to ensure that the system currents Iin1 and Iin2 are within a system interface current rating. If Iin1 is larger than Iin2, Vout1 is lowered by steps until Iin1 and Iin2 are within acceptable current ratings. The current sense module 402 senses the input current Iin1 to the voltage regulator 202A that adjusts the output voltage, Vout1. If Iin1 is larger than Iin2, Vout1 is lowered by the voltage regulator 202A incrementally until Iin1 and Iin2 are within acceptable current ratings.

It is noteworthy that the various voltage, impedance and current values described above with respect to FIGS. 2A, 2C, 3A and 4A are simply shown as examples. The various adaptive aspects of the present disclosure are not limited to any specific value. Furthermore, any common component between the various figures are only described once for brevity sake.

Figure 5A:
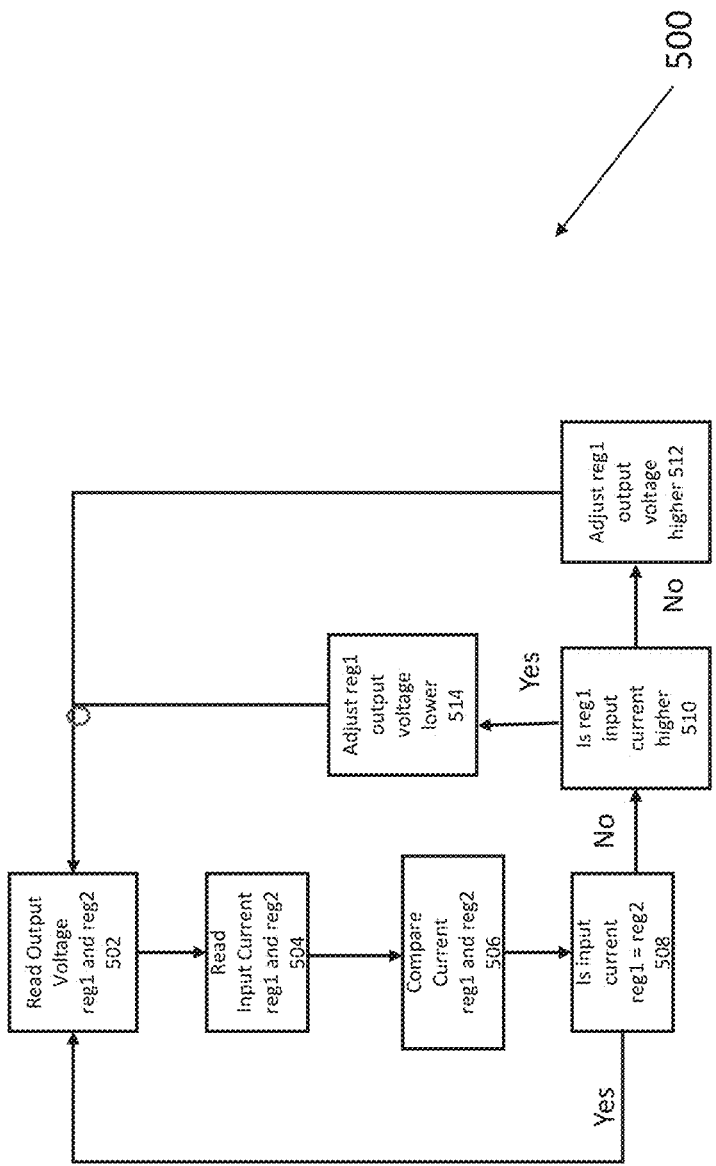
FIG. 5A shows an example of a process flow diagram, according to one aspect of the present disclosure.

Process Flows: FIG. 5A shows a process flow 500 for using system 300 of FIG. 3A and/or system 400 of FIG. 4A, according to one aspect of the present disclosure. Process 500 for system 300 can be executed using the microcontroller 304 that reads an input current and instructs the digital regulator 302A/302B to adjust their output. Process 500 for system 400 is executed using a feedback loop (e.g., 206, FIG. 2E) of the voltage regulator 202A and the current sense module (which may include amplifiers) 402.

In one aspect, in block 502, the output voltage of the voltage regulators (e.g., 302A/302B (FIG. 3A) and 202A/202B (FIG. 4A) are read. The input current to the voltage regulators are read in block 504. The currents are compared in block 506. If the input current of both the regulators is the same and within a defined threshold value, the process loops back to block 502. If not, the process in block 510 determines if the input current to the first voltage regulator (e.g., 302A, FIG. 3A or 202A, FIG. 4A) is higher. If yes, then the output of the first regulator (302A, FIG. 3A or 202A, FIG. 4A) is adjusted in block 514. If the input current to the second voltage regulator (e.g., 302B, FIG. 3A or 202B, FIG. 4A) is higher, then the output of the second voltage regulator (e.g., 302B, FIG. 3A or 202B, FIG. 4A) is adjusted in block 512.

In one aspect, methods and systems are provided for current balancing. One method includes comparing (e.g., 506, FIG. 5A) a first input current of a first regulator (e.g. 302A, FIG. 3A or 202A, FIG. 4A) in a first path (e.g., 116A) between a power source (e.g., 102) and a power sink (e.g., 114) with a second input current of a second regulator (e.g., 302B, FIG. 3A or 202B, FIG. 4A) in a second path (e.g., 116B) between the power source and the power sink; lowering (e.g., 514, FIG. 5) an output from the first regulator, in response to the first input current being higher than the second input current; and increasing (e.g., 512, FIG. 5A) an output from the second regulator, in response to the second input current being higher than the first input current.

Figure 5B:
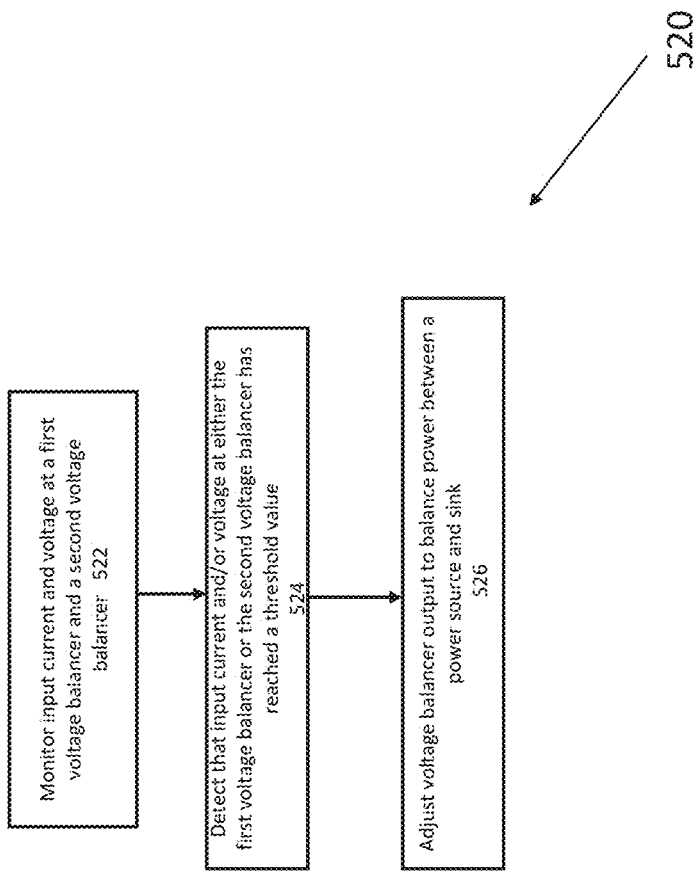
FIG. 5B shows an example of another process flow diagram, according to one aspect of the present disclosure.

FIG. 5B shows a process 520 for power balancing in system 200 of FIG. 2A and/or system 200A of FIG. 2C, according to one aspect of the present. Process 520 begins with monitoring the input current and voltage in paths 116A/116B (FIG. 2A/2C) in block 522. In block 524, the process detects that a first input voltage (or current) of the first voltage balancer (202A, FIG. 2A/2C) is higher than a pre-defined, first threshold value while a second input voltage at a second voltage balancer (202B, FIG. 2B/2C) in a second path between the power source 102 and the sink 114 is within the pre-defined, first threshold value.

In block 526, the first voltage balancer 202A adjusts an output voltage for balancing a first power output in the first path and a second power output in the second path; and then provides the first power output and the second power output to the sink 114 as a system load (e.g., 110, FIGS. 2A/2C).

Thus, methods and systems for current, voltage and power balancing have been described. Note that references throughout this specification to "one aspect" (or "embodiment") or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method, comprising:
comparing, by a micro-controller device, a first input current of a first regulator in a first path between a power source and a power sink with a second input current of a second regulator in a second path between the power source and the power sink, the micro-controller device being configured to read the first input current from the first regulator and the second input current from the second regulator and to communicate instructions to the first regulator and the second regulator;
lowering, by the micro-controller device, an output from the first regulator, in response to the first input current being higher than the second input current; and
increasing, by the micro-controller device, an output from the second regulator, in response to the second input current being higher than the first input current.

2. The method of claim 1, wherein the first regulator and the second regulator interface with the micro-controller device, and the micro-controller device compares the first input current and the second input current.

3. The method of claim 1, wherein the first regulator is an analog voltage regulator coupled to a current sense module that receives the first input current, and the first regulator adjusts a voltage output of the analog voltage regulator to lower the first input current below a certain level.

4. The method of claim 1, wherein the second path includes a coupling circuit to separate a data signal and power in the second path.

5. The method of claim 1, wherein the output from the first regulator is provided as input to a first oring diode connected to the power sink.

6. The method of claim 1, wherein the output from the second regulator is provided as input to a second oring diode connected to the power sink.

7. The method of claim 1, wherein impedance difference between the first path and the second path results in difference between the first input current and the second input current.

8. A method, comprising:
detecting, by a first voltage balancer, in a first path between a power source and a power sink that a first input voltage of the first voltage balancer is higher than a first threshold value while a second input voltage at a second voltage balancer in a second path between the power source and the power sink is within the first threshold value;
adjusting, by the first voltage balancer, an output voltage for balancing a first power output in the first path and a second power output in the second path; and
providing the first power output and the second power output to the power sink as a system load.

9. The method of claim 8, wherein the first voltage balancer is configured to operate as a voltage regulator with a feedback loop.

10. The method of claim 8, wherein the second path includes a coupling circuit to separate a data signal and power in the second path.

11. The method of claim 8, wherein the output from the first voltage balancer is provided as input to a first oring diode connected to the power sink.

12. The method of claim 8, wherein the output from the second voltage balancer is provided as input to a second oring diode connected to the power sink.

13. The method of claim 8, wherein impedance difference between the first path and the second path results in difference between the first input voltage and the second input voltage.

14. The method of claim 8, wherein the first path uses a connecter power pin with a first current rating and the second path uses a signal pin with a second current rating that is lower than the first current rating.

15. A system, comprising:
a power source operationally coupled to a power sink via a first path having a first regulator and a second path having a second regulator, the first regulator receiving a first input to generate a first output, the second regulator receiving a second input to generate a second output; the first input being different from the second input due an impedance different between the first path and the second path; wherein the first regulator adjusts the first output based on a difference between the first input and the second input.

16. The system of claim 15, wherein the first regulator is a first voltage balancer and the second regulator is a second voltage balancer, wherein the first voltage balancer adjust a first voltage output based on a first input current to the first voltage balancer to balance power between the first path and the second path.

17. The system of claim 15, wherein the first regulator is coupled to a current sense module that detects a first input current to the first regulator and the first regulator adjusts an output voltage based on the first input current.

18. The system of claim 15, wherein the first input is a first input current and the second input is a second input current, and the first regulator and the second regulator interface with a microcontroller that detects a difference between the first input current and the second input current.

19. The system of claim 18, wherein the first regulator lowers an output voltage, in response to the first input current being greater than the second input current.

20. The system of claim 18, wherein the second regulator increases an output voltage, in response to the first input current being lower than the second input current.

* * * * *